United States Patent
Li

(10) Patent No.: US 10,334,014 B2
(45) Date of Patent: Jun. 25, 2019

(54) ACCESSING CONNECTED SERVICE RESOURCES IN A DISTRIBUTED APPLICATION PROGRAMMING INTERFACE

(71) Applicant: Futurewei Technologies, Inc., Plano, TX (US)

(72) Inventor: Li Li, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 255 days.

(21) Appl. No.: 15/354,992

(22) Filed: Nov. 17, 2016

(65) Prior Publication Data

US 2018/0139262 A1    May 17, 2018

(51) Int. Cl.
*H04L 29/08* (2006.01)

(52) U.S. Cl.
CPC .............. *H04L 67/02* (2013.01); *H04L 67/10* (2013.01)

(58) Field of Classification Search
None
See application file for complete search history.

(56) References Cited

U.S. PATENT DOCUMENTS

| 9,501,581 | B2 * | 11/2016 | Liang | ................ | G06F 17/30902 |
| 2014/0380144 | A1 * | 12/2014 | Liang | ................ | G06F 17/30902 |
| | | | | | 715/234 |

OTHER PUBLICATIONS

Li et al. "Compatibility Modelling and Testing of REST API Based on REST Chart", Conference Paper, May 2015, WEBIST 2015, pp. 194-201.
Fielding "Architectural Styles and the Design of Network-based Software Architectures", University of California, Irvine, 2000, 180 pages.
Hadley "Web Application Description Language", W3C Member Submission Aug. 31, 2009, 21 pages.
Rosen et al. "RFC 3031—Multiprotocol Label Switching Architecture", Standards Track, Jan. 2001, 61 pages.

* cited by examiner

*Primary Examiner* — Brian Whipple
(74) *Attorney, Agent, or Firm* — Vierra Magen Marcus LLP

(57) ABSTRACT

The disclosure relates to technology for accessing connected resources in a distributed application programming interface (API) of a network. A request is received from a client node, where the request includes one or more service labels indicating a selection of services to invoke. The one or more resources to visit are identified for the services requested according to resource connections. A response is then sent to the client node in which the response includes one or more hyperlinks to the one or more resources identified, where the one or more hyperlinks are annotated with the one or more service labels to indicate the services requested.

23 Claims, 15 Drawing Sheets

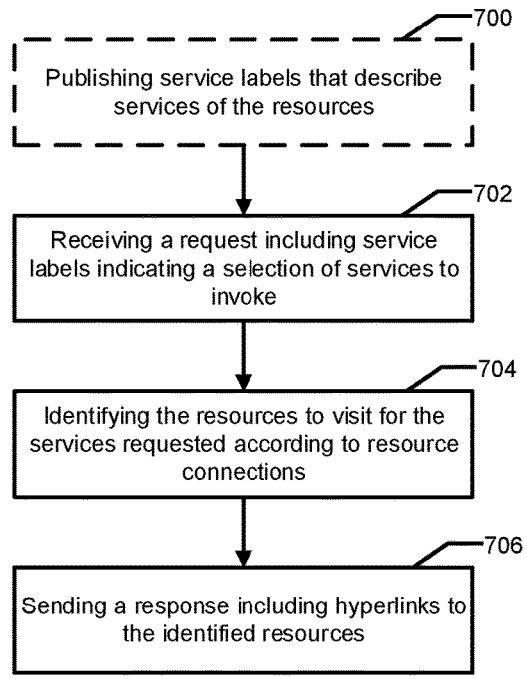
FIG. 7A
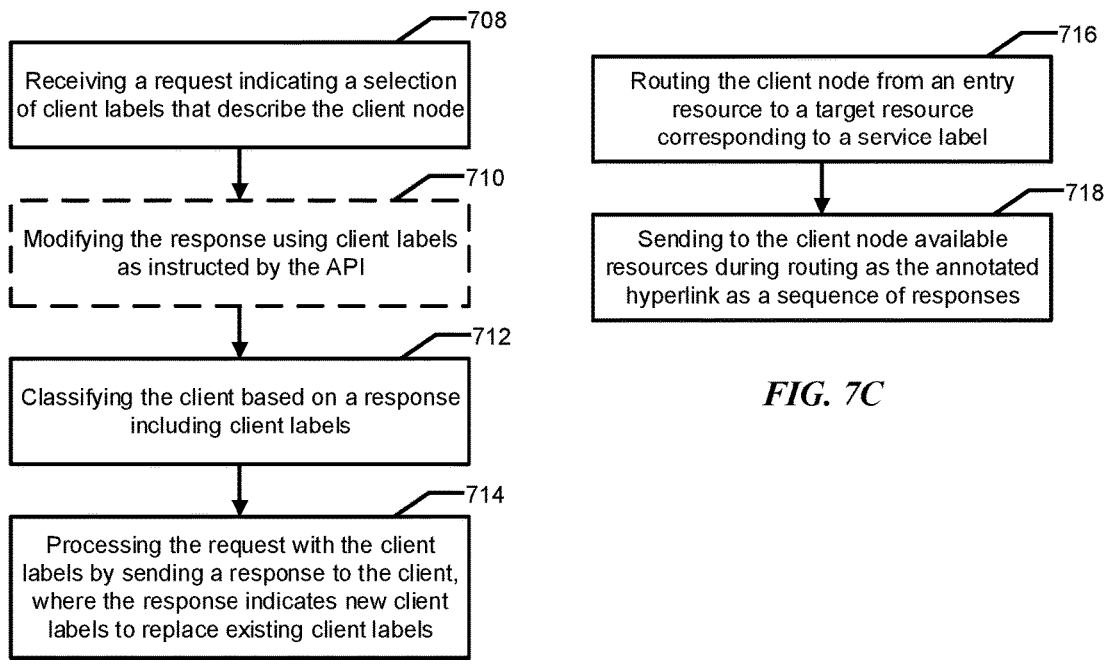
FIG. 7B
FIG. 7C

ACCESSING CONNECTED SERVICE RESOURCES IN A DISTRIBUTED APPLICATION PROGRAMMING INTERFACE

BACKGROUND

Web services are client and server applications that communicate over a network protocol, such as hypertext transfer protocol (HTTP). A web service is a software component provided through a network-accessible endpoint and can be called from other applications. For example, a financial company may have a web service that provides customers to transfer money between bank accounts. The information provided by the web service can be read from a web page and displayed, or read from a stand-alone application on a customer's desktop computer or mobile device.

Representational state transfer (REST) is a style of software architecture for distributed systems, such as the World-Wide-Web. REST-style architectures include clients and servers. Clients can initiate requests to the servers, which can process the requests and return appropriate responses. In REST, requests and responses are built around the transfer of representations of resources. A representation of a resource is typically a hypertext document that captures the current or intended state of the resource. For example, the resource may be mortgage rates from a financial institution.

BRIEF SUMMARY

In a first embodiment, there is method for accessing connected resources in a distributed application programming interface (API) of a network, comprising: receiving a request from a client node, the request including one or more service labels indicating a selection of services to invoke; identifying the one or more resources to visit for the services requested according to resource connections; and sending a response including one or more hyperlinks to the one or more resources identified, the one or more hyperlinks being annotated with the one or more service labels to indicate the services requested.

In a second embodiment according to the first embodiment, the API defines the resource connections between the one or more resources, and at least one of the resources provides the selection of services requested.

In a third embodiment according to any of the first through second embodiments, the method further comprises publishing the one or more service labels, wherein the service labels describe services of the one or more of the resources provided by the API.

In a fourth embodiment according to any of the first through third embodiments, the request further includes a selection of one or more client labels that describe the client node, and the response to the request modifies the one or more client labels as instructed by the API.

In a fifth embodiment according to any of the first through fourth embodiments, the method further comprises classifying the client node sending a request by sending a response, the response indicating the selected one or more client labels; and processing the request with the one or more client labels by sending a response to the client node, the response indicating one or more new client labels to replace the existing one or more client labels.

In a sixth embodiment according to any one of the first through fifth embodiments, the method further comprises routing the client node from an entry resource of the one or more resources to a target resource of the one or more resources that corresponds to the one or more service labels, wherein the one or more resources available during the routing are sent to the client node as the annotated one or more hyperlinks as a sequence of responses.

In a seventh embodiment according to any one of the first through sixth embodiments, the response to the request does not identify the resource connections between the one or more resources.

In an eight embodiment according to any one of the first through seventh embodiments, the one or more service labels comprise one or more of a uniform resource identifier (URI) that identifies the services, a URI template that identifies a collection of the services and media types that identify the request to and the response from the services.

In a ninth embodiment according to any one of the first through eighth embodiments, the API stores rule sets comprising one or more condition-action pairs defining the annotated one or more hyperlinks, and a condition matches the one or more service labels and client labels and an action annotates the one or more hyperlinks with the one or more service labels and modifies the one or more client labels in a response.

In a tenth embodiment according to any one of the first through ninth embodiments, the request is a hypertext transfer protocol (HTTP) request and the response is a HTTP response, and the one or more service labels in the annotated one or more hyperlinks are encoded by at least one of HTML, XML, JSON and YAML.

In an eleventh embodiment according to any one of the first through tenth embodiments, there is a non-transitory computer-readable medium storing computer instructions for accessing connected resources in a distributed application programming interface (API) of a network, that when executed by one or more processors, perform the steps of: receiving a request from a client node, the request including one or more service labels indicating a selection of services to invoke; identifying the one or more resources to visit for the services requested according to resource connections; and sending a response including one or more hyperlinks to the one or more resources identified, the one or more hyperlinks being annotated with the one or more service labels to indicate the services requested.

In a twelfth embodiment according to any one of the first through eleventh embodiments, there is a node for accessing connected resources in a distributed application programming interface (API) of a network, comprising: a non-transitory memory storage comprising instructions; and one or more processors in communication with the memory, wherein the one or more processors execute the instructions to: receive a request from a client node, the request including one or more service labels indicating a selection of services to invoke; identify the one or more resources to visit for the services requested according to resource connections; and send a response including one or more hyperlinks to the one or more resources identified, the one or more hyperlinks being annotated with the one or more service labels to indicate the services requested.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 7A-7C illustrates example flow diagrams of accessing connected resources in a network according to the disclosed technology.

DETAILED DESCRIPTION

Figure 1:
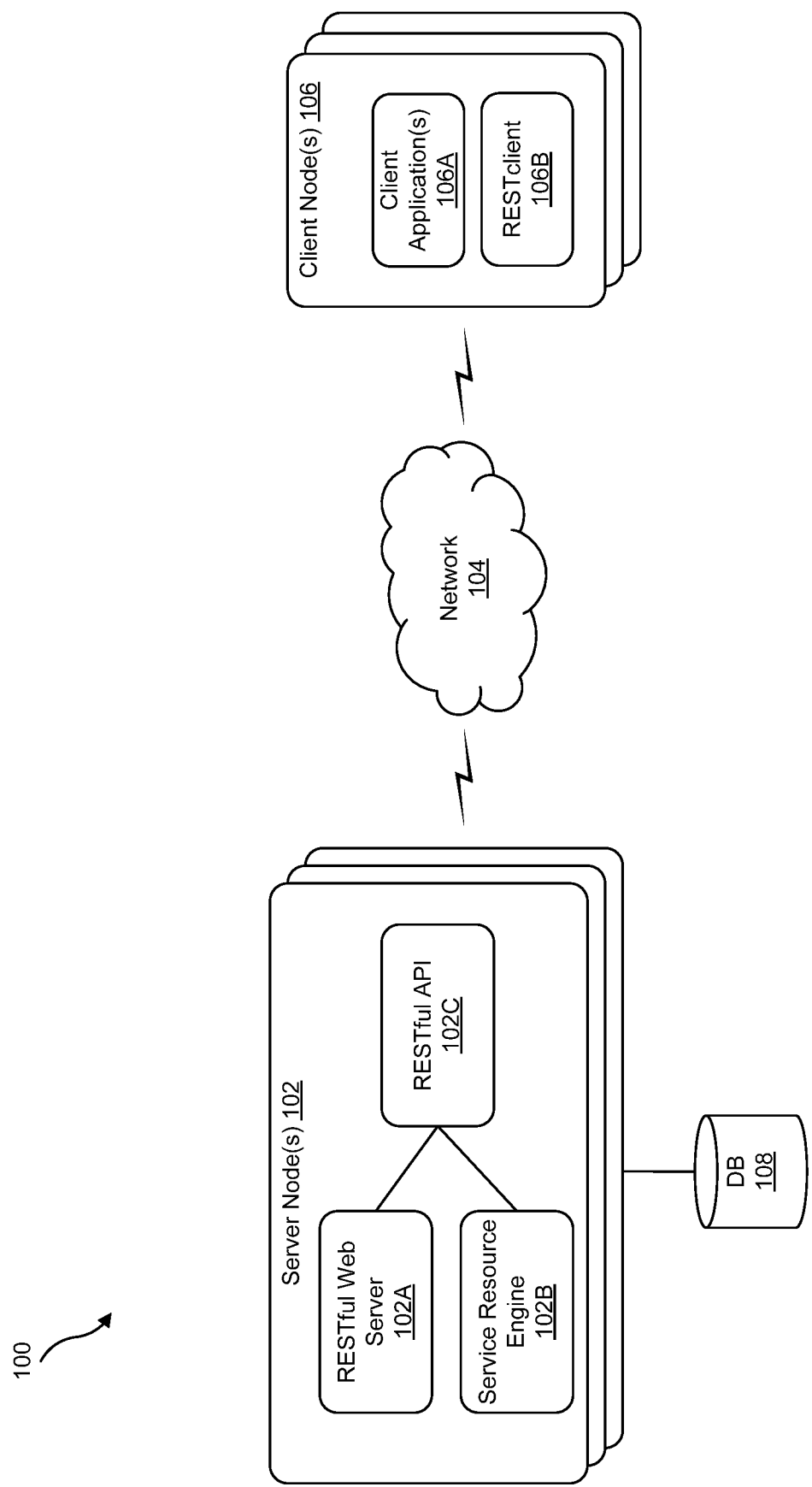
FIG. 1 illustrates an example system for accessing connected resources in accordance with the disclosed technology.

The disclosure relates to technology for accessing connected service resources in a distributed application programming interface (API) between server and client nodes using a representational state transfer (REST) style architecture. A REST API (also known as a REST web service) is a web service API that is implemented using HTTP and the REST style architecture. Within the context of the REST style architecture, REST resources, or service resources, are identified by uniform resource identifiers (URIs) and connected by hyperlinks into a dynamic and directed graph in which a client node may be directed from an entry resource to reach any of the service resources, such as a target resource, through hypertext-driven interactions.

In particular, the server node publishes service labels that describe various services of the service resources. The service labels, in one embodiment, are published without revealing connections between the service resources to the client node. However, the client node may use the published service labels to indicate to the REST API a selection of the service labels it wishes to invoke, such that the REST API may determine a sequence of connections the client node should take to reach a specified target resource. The server node, in response to the client node indication of service labels, sends a message to the client node including hyperlinks. The hyperlinks are annotated with the service labels (and optionally client labels) based on rule sets of the REST AP. Subsequently, the client node determines a sequence of the hyperlinks to visit based the service labels annotated with the hyperlinks, such that each of the hyperlinks directs the client to a corresponding one of the service resources until a target resource is reached.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

As indicated above, a REST API specifies an architecture style for client/server-based distributed computer systems. These APIs generally define functional or operation-based interfaces between systems or services and application programs that access the systems or services through the APIs. An API is often a collection of functional declarations or a list of operations that specify what type of operations are provided by a system or service and how those operations are invoked from an application program.

There are many different types of APIs that provide interfaces to many different types of systems and services. In one embodiment, the APIs are directed to APIs for web services provided by server computers or nodes, generally through the Internet, to remote client computers or nodes. One type of web-service API is commonly referred to as the above-mentioned REST (or RESTful) API.

A REST API is stateless. In other words, server nodes do not save state information for particular client nodes across multiple resource requests. Instead, in a REST API, each request message contains sufficient information for a server node to handle the request. As a consequence of this stateless architecture, when some type of context is maintained across multiple requests, it is the client node's responsibility to maintain the context.

FIG. 1 illustrates an example system for accessing connected resources in accordance with the disclosed technology. The system 100 includes a server node(s) 102 (communicatively coupled to a database 108), network 104 and client node(s) 106. The network 104 may be any public or private network, or a combination of public and private networks such as the Internet, and/or a public switched telephone network (PSTN), or any other type of network that provides the ability for communication between computing resources, components, users, etc.

Client node(s) 106 include, for example, client application(s) 106A and REST client 106B that communicates via networks 104 with server node(s) 102. As appreciated, communications between the client node(s) 106 and server node(s) 102 may use one type (or protocol) of messaging for sending and receiving. For example, in some embodiments the communication comprises a plurality of RESTful API messages (i.e., HTTP messages), including operations such as GET, POST, PUT, DELETE, etc.

The client node(s) 106 may be any type of device, such as a smart phone, tablet, desktop, laptop, etc., and includes, but is not limited to, client application(s) 106A and REST client 106B. The client application(s) 106A, such as a web browser, in conjunction with REST chant 106B may consume the RESTful API via a standard HTTP protocol. The RESTful API may include, for example, Java Script running on the web browsers of the client node(s) 106, as well as native applications (e.g., client API) running on mobile platforms (e.g., iOS, Android, etc.). Thus, the REST client 106B, in some embodiments, may be one or more software instructions which, when executed by a processor of an underlying client node(s) 106, cause the client node(s) 106 to send and/or receive RESTful API messages (i.e., HTTP messages) to/from the server node(s) 102.

Server node(s) 102 includes, for example, a RESTful web server 102A, a service resource engine 102B and RESTful API 102C. In some embodiments, the server node(s) 102 is communicatively coupled to a storage or storage system, such as one or more database (DB) 108 that stores, for example, rule sets, resources, services and graphical model representations of network resources. In one embodiment, the rule sets are defined in a label table and stored in the DB 108. The server node(s) 102 may be programmed to provide a REST-based web service via the RESTful API 102C that allows an application on server node(s) 102 to generate custom resources and also provide access to those custom resources via the RESTful API 102C.

REST-based web services are organized into resources, each of which together include related information, such as a user profile, a collection of updates (activities), or a global user ID. Each resource is identified by one or more URI(s) such that, to access the resource, an application calls an HTTP operation on one of the resource's URIs.

As will be explained in further detail below, in addition to providing resources, the server node(s) 102 publishes service labels that may be utilized by client node(s) 106 to navigate through the various resources, without revealing the connections or relationships between resources.

The RESTful API 102C is configured to transmit and receive RESTful API messages (i.e., HTTP messages). In some embodiments, upon receipt of a request message, the RESTful API 102C determines whether the message is directed toward creating or modifying a definition of a resource in which case the request message may be routed to a service resource 102B to service the request.

In one embodiment, the service resource engine 102B accesses a database 108 for the purpose of creating or modifying a definition of a resource in response to an API request to create or modify the resource. For example, upon a request to create a resource, the service resource engine 102B may create a table, such as a label table (described below), in the database 108, modify metadata (e.g., an XML file) for a service label (described below) associated with the resource to describe the data of the resource (e.g., how it relates to the services), and/or modify metadata for the service label associated with the resource to describe one or more different ways the representations of the resource may be viewed and/or interacted with by end users.

Figure 2:
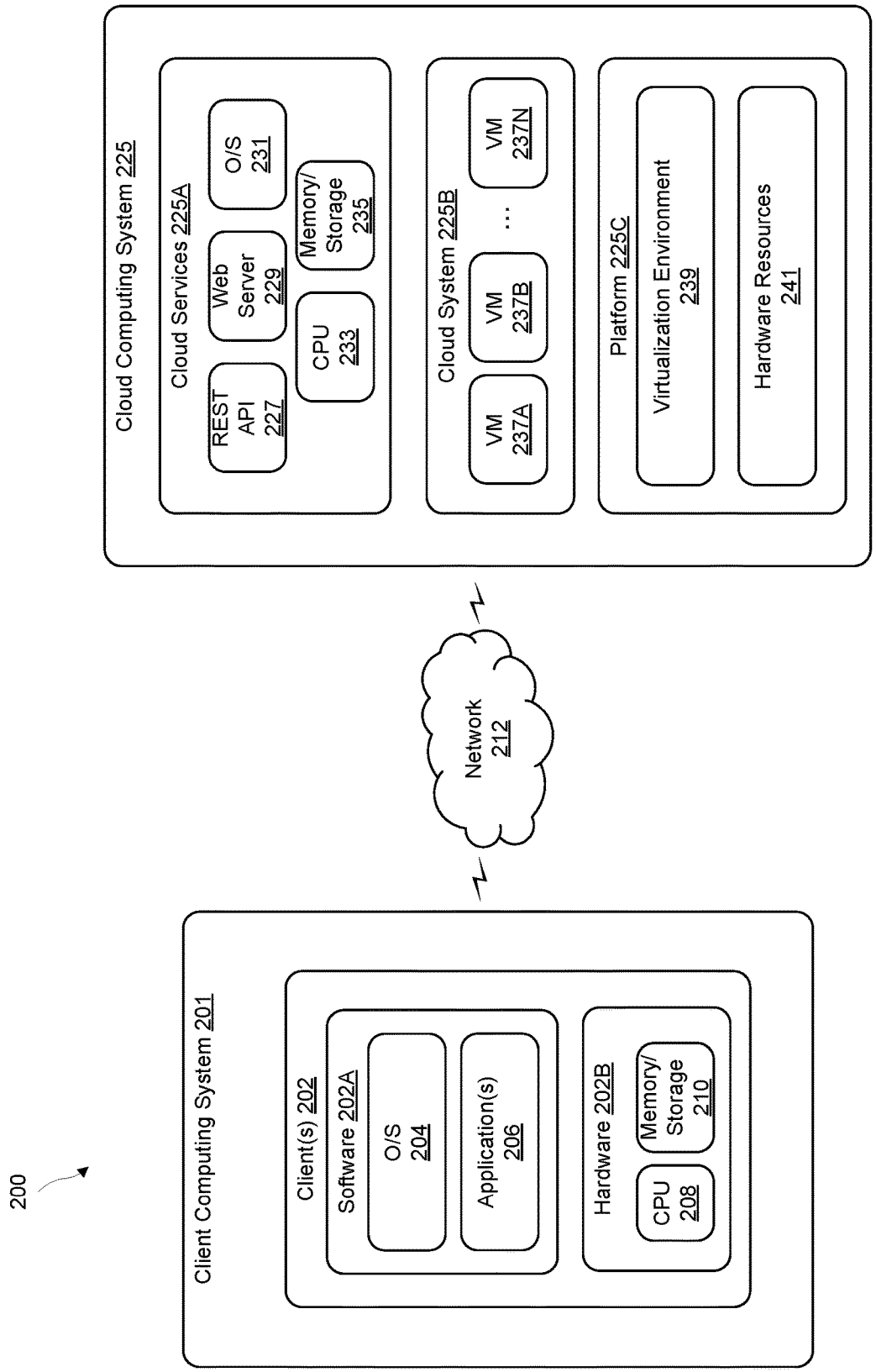
FIG. 2 illustrates an example computing system in which one or more embodiments of the present technology may be implemented.

FIG. 2 illustrates an example computing system in which one or more embodiments of the present technology may be implemented. The computing system 200 includes a client computing system (node) 201 and a cloud computing system 225 which are communicatively coupled via a network 212, such as the Internet.

Client computing system 201 includes one or more clients 202, each of which can include hardware 202B, such as a server, a desktop, a laptop, a tablet, a handheld device, or the like. The hardware 202B may include conventional components of a computing device, such as one or more central processing units (CPUs) 208 and system memory and/or storage 210, as well as other input/output and support devices, such as a mouse, keyboard, and the like (not shown).

Each CPU(s) 208 is configured to execute instructions that perform one or more operations described herein. The instructions can be stored in memory/storage 210, or any other memory in the client 202 (e.g., cache memory).

Memory/storage 210 includes device(s) that store information and can include, for example, random access memory (RAM), read-only memory (ROM), local storage devices, such as hard disks, flash memory modules, solid state disks, optical disks, and the like.

The client 202 may also include software 202A, such as an operating system (OS) 204 and one or more applications 206. Application(s) 206 can include various types of applications executable within the OS 204. In one example embodiment, application(s) 206 include a cloud manager configured to perform various tasks to manage virtual computing resources provided by cloud computing system 225. Cloud computing system 225, as described further below, can provide access to resources through a REST API.

Cloud computing system 225 includes, for example, cloud services 225A, cloud system 225B and platform 225C. Cloud services 225A may include both hardware and software. For example, the hardware may comprise components of a computing device, such as one or more central processing units (CPUs) 233, memory/storage 235, etc. The software may include, for example, REST API 227, a web server 229, an OS 231, etc.

REST API 227 includes various REST API operations that can be invoked by client computing system 201 through communication with web server 229. API operations can include, for example, creation and management of virtual machines (VMs) 237A, 237N . . . 237N in cloud system 225B. Cloud system 225B includes, for example, one or more VMs 237A, 237N . . . 237N configured to host various applications. VMs 237A, 237 . . . 237N provide abstractions of processor, memory, storage, and networking resources.

Platform 225C includes, for example, virtualization environment 239 and hardware resources 241. Virtualization environment 239 can be implemented by running hypervisors on various hosts (not shown), such as Microsoft Hyper-V® virtualization technologies. Hardware resources 241 include computing resources, storage resources, network resources, and the like. Hardware resources 241 may be configured to provide virtualization environment 239 sufficient resources that support the execution of virtual machines 237A, 237N . . . 237N.

Figure 3A:
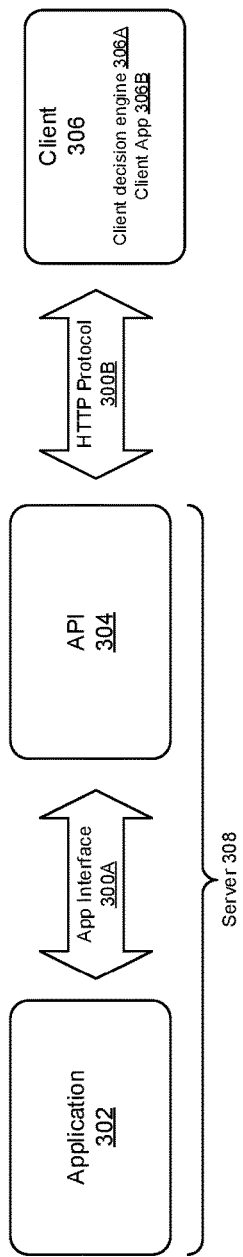
FIG. 3A illustrates another example distributed system for implementing the disclosed technology.

FIG. 3A illustrates another example of a distributed system for implementing the disclosed technology. As illustrated, a client 306 is communicatively coupled with one or more servers 308 via the HTTP protocol 300B, where the one or more servers 208 is provided with one or more applications (or services) 302, an API 304 and an application interface 300A between the one or more applications 302 and the API 304.

Client 306 communicates with server(s) 308, for example, across a network (no shown) via data requests and responses using, for example, HTTP. Client 306 may be a computing device, such as client node 106 or client computing system. Such a computing device can include, but is not limited to, a processor and memory for executing and storing instructions. Software may include one or more applications and an operating system. Hardware can include, but is not limited to, a processor, memory and graphical user interface display. The computing device may also have multiple processors and multiple shared or separate memory components.

As illustrated, client 306 may include a client decision engine 306A and a client application 306B. Although not depicted, the client 306 may include other components, such as a REST library and an HTTP library.

The client decision engine 306A comprises, for example, a decision making function that enables the client 306 to determine how to handle responses provided by the server

308, such as determining which hyperlinks in the response to follow. As explained in detail below, the decision making function utilizes service labels (S-labels) annotated in the hyperlinks of a response sent by the server 308 to make such determinations.

Client application 306B may comprise functionality that allows for interaction between the client 306 and server 308, for example using a web browser to exchange REST API messages (e.g., HTTP messages). The client application 306B may transmit one or more data requests to server(s) 308 using HTTP 300B. In one embodiment, the client application 306B sends data requests in response to user input received at client 306 via an input device (e.g., a keyboard, mouse, or touchscreen, as noted above) coupled to client 306. For example, an HTTP request message sent by client 306 may include one or more standard HTTP methods, for example and without limitation, the "GET," "POST," "PUT," and "DELETE" methods. Similarly, the client application 306B may receive data responses from the server 308 in response to a request. For example, an HTTP response message sent by the server 208 may include hypertext with hyperlinks, as described in more detail below.

In an embodiment, server(s) 308 invokes API 304 to perform one or more operations specified by the data requests. Results of such operation(s) performed by API 304 are sent as a response messages (i.e., HTTP response) to client 306. API 304 can be any API used to access services and/or resources between the server(s) 308 and client 306. For example, API 304 may be implemented as a web service or web API. In an embodiment, API 304 implements a REST API, as described above. Consequently, such a REST API can have a plurality of constraints, invariants or predicate conditions that hold true before and after the execution of the one or more operations specified by data requests.

For example, some of the invariants associated with such a REST API may be used to define the type and structure of data requests (e.g., in the form of HTTP request messages). Further, such invariants may also be used to define the proper structure of responses from API 304. For example, a proper structure of each response from API 304 may be based on the type of data request that is transmitted by the client 306 to API 304 on server(s) 308. It is appreciated that the content of the data requests and responses may be formatted using any number of well-known programming, scripting, and/or markup languages including, for example and without limitation, JavaScript Object Notation (JSON), Extensible Markup Language (XML), or Hypertext Markup Language (HTML).

Figure 3B:
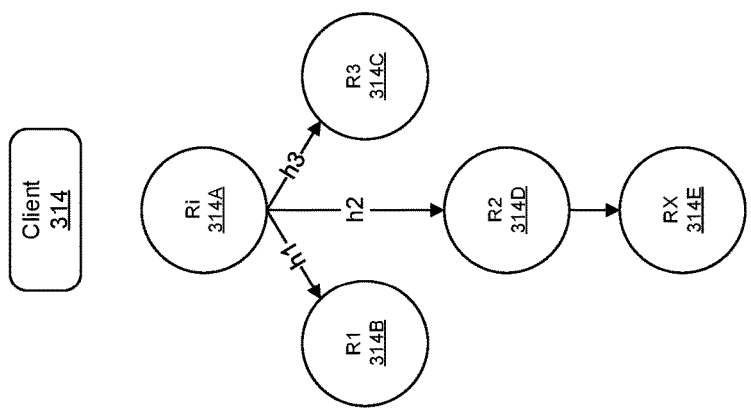
FIG. 3B illustrates a user navigating a website for a particular resource.
Figure 3C:
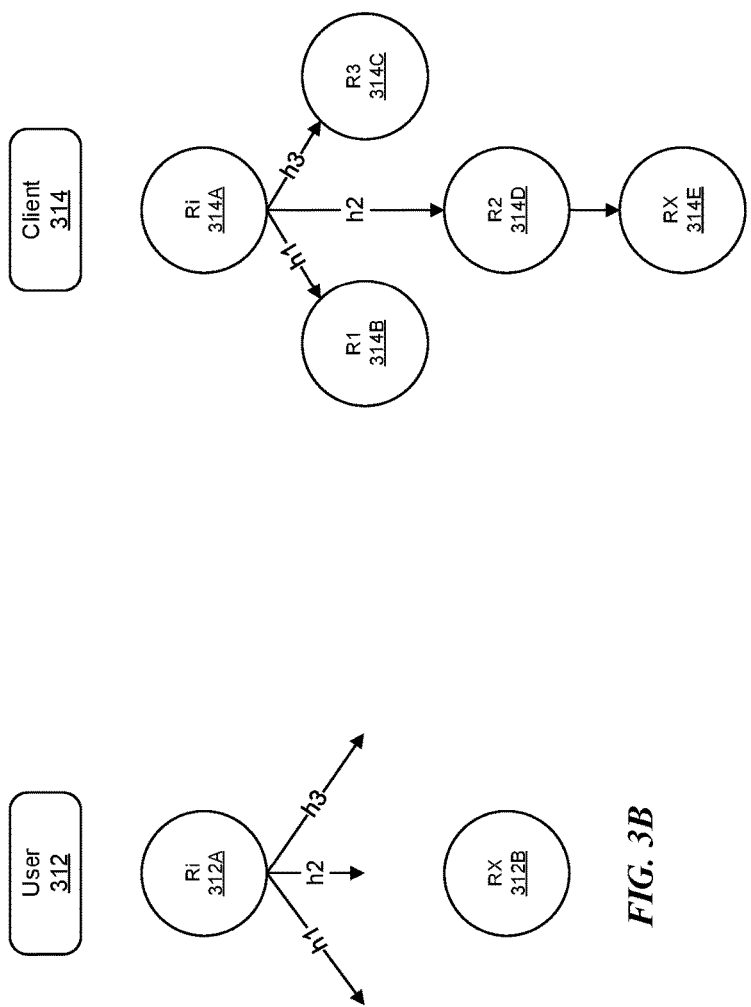
FIG. 3C illustrates a client navigating a website for a particular resource.

FIGS. 3B and 3C illustrate examples of navigating resources using a REST API. As explained above, REST APIs, such as API 304, consist of distributed resources (Ri ... Rx) which are identified by URIs and connected by hyperlinks using a dynamic and directed graph (as illustrated in FIGS. 3B and 3C). A user 312 or client 314 can begin at an entry point (e.g., an entry resource, such as Ri) of the REST API 304 and reach any resource (Ri ... Rx) through hypertext-driven interactions. It is appreciated that in the examples that follow, the depicted graphs, resources and hyperlinks are non-limiting and simplistic for purposes of discussion.

The example of FIG. 3B illustrates a user navigating a website for a particular resource. As depicted, the connected paths between resources may be represented using a directed graph or data model, in which circles represent individual resources (service resources) and directed arrows represent hyperlinks between the resources.

For example, user 312 may visit a homepage of a website for a financial institution, represented by Ri 312A, in an attempt to transfer money from one account to another account. The homepage Ri 312A may provide the user 312 with three options: 1) check balance, 2) move money, and 3) contact us. Each of the options is selectable by the user 312 via an associated hyperlink h1 (check balance), h2 (move money) and h3 (contact us) that appears, for example, on a display of the user device. In the example, since the user 312 is attempting to transfer money between bank accounts, hyperlink h2 is selected. Selection of hyperlink h2 routes the user 312 to the selected resource, e.g. "transfer money" page Rx 312B, of the financial institution website. In the event the selected hyperlink is not correct or not working properly, the user 312 may select a different hyperlink until she reaches her target. Understandably, while this solution may be effective for users 312, who may easily interpret natural language selections appearing on the display as a hyperlink, it is difficult for a REST client to select a proper link (and hence route) based on natural languages. That is, it is difficult for a REST client to parse and derive meaning from human or natural language input given currently available analysis and processing tools.

FIG. 3C illustrates a client navigating a website for a particular resource. In this example, a client 314 (such as client 106 or 206, or REST client residing thereon) is responsible for navigating through resources Ri ... Rx until reaching or visiting a target resource (similar to the example in FIG. 3B). This is accomplished by a REST API 304 publishing resource connections (i.e., connections between each of the resources using hyperlinks) using a high-level markup language, such as a web application description language (WADL).

The client 314 (or REST client) plans a route through the resources based on the connections or relationships published by the REST API 304. For example, the published connections may be modeled as the directed graph in FIG. 3C, in which hyperlinks h1, h2 and h3 provide connections between resource Ri 314A and resources R1 314B, R2 314D and R3 314C, respectively. The client 314 may follow a planned path according to the directed graph and hyperlinks until reaching a target resource Rx 314E. However, each time the REST API 304 changes connections (i.e., republishes the connections), the client 314 must re-plan the route along the directed graph. Furthermore, as the client 314 plans paths independently based on static resource connections, they may result in unbalanced traffic loads across resources Ri 314A ... Rx 314E.

Figure 4:
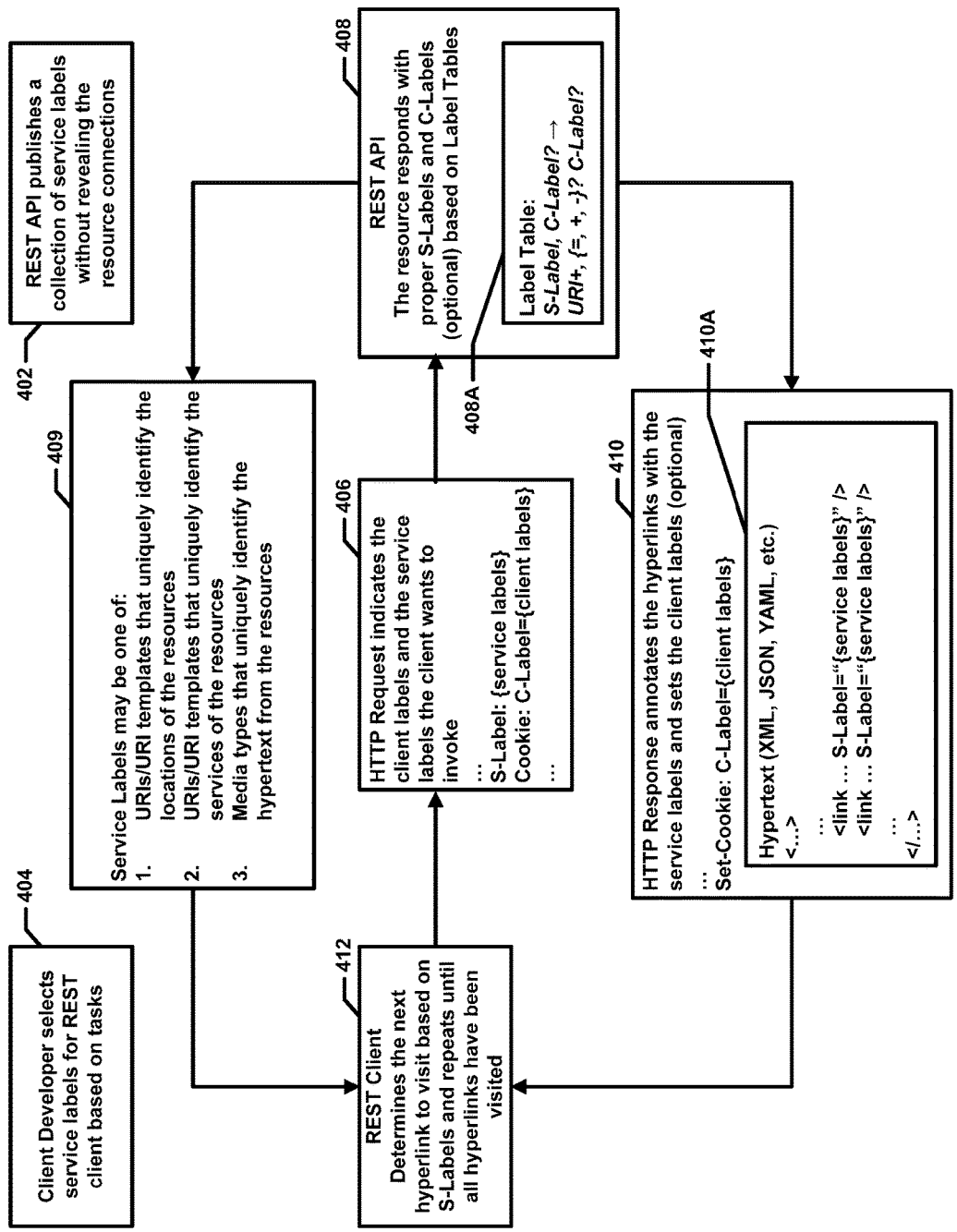
FIG. 4 illustrates an example flow diagram of accessing resources in accordance with the disclosed technology.

FIG. 4 illustrates an example flow diagram of accessing resources in accordance with the disclosed technology. In the description that follows, the procedures may be implemented by a processor(s) residing on a server or client node that executes instructions stored in a memory. For purposes of discussion, the diagram depicts both the service node and client node sides of the procedure and will be discussed in conjunction with the system depicted in FIG. 3A. It is appreciated that the implementation is not limited to such an embodiment and that any combination of system, component(s) or node(s) as illustrated in any one of FIGS. 1, 2, 3A and 8 may execute the procedures.

At 402, the REST API 304 of server(s) 308 initially publishes a collection of S-labels to the network without revealing any of the relationships or connections between the system resources. These S-labels may be an abstract identifier that is determined, for example, by a client or operator. As explained above, an S-label describes services of one or more system resources (or service resources)

provided by the REST API 304. For example, the S-labels may be identified as one of URIs or URI templates that uniquely identify the locations of the system resources, URIs or URI templates that uniquely identify the services of the resources and/or media types that uniquely identify the hypertext from the resources (409). In one illustrative embodiment, an S-label template identifies the service resource as transferring money between bank accounts.

Once the server(s) 308 publishes the collection of service labels, the client 306 may select one or more of the S-labels based on tasks at 404. For example, a client 306 wants a service that is capable of transferring money between banking accounts. To accomplish this task, the client 306 selects S-label(s) from the published collection of S-labels that identifies the resource(s) for transferring money between bank accounts.

At 406, the client 306 sends a request, such as an HTTP request (or HTTP request message), including the S-labels associated with services that the client is attempting to reach or invoke. These messages also contain some metadata about the message. For example, an HTTP request for RESTful Web services appears as follows:

| HTTP request format |
| --- |
| <VERB>   <URI>   <HTTP Version> |
| <Request Header> |
| <Request Body> |

The HTTP request format consists of: (1) a <VERB> that is one of the HTTP methods like GET, PUT, POST, DELETE, OPTIONS, etc., (2) a <URI> that is the URI of the resource on which the operation is going to be performed, (3) an <HTTP Version> is the version of HTTP, generally "HTTP/1.1," (4) a <Request Header> that contains the metadata as a collection of key-value pairs of headers and their values. These settings contain information about the message and its sender like client type, the format(s) a client supports, format type of the message body, cache settings for the response, S-labels, etc., and (5) a <Request Body> that is the actual message content. In a RESTful service, this includes the representations of resources.

In one embodiment, the HTTP request also includes a list of one or more C-labels that identifies the type of client to the API 304 of server(s) 308. For example, one or more <request header> may be added to the HTTP request format that identifies the service labels (S-Label: {service labels}) and the client labels (Cookie: C-Label={client labels}). A more detailed explanation of requesting a particular S-label and corresponding service is provided below with the figures that follow.

The HTTP request is received by the API 304 on the server(s) 308 at 408, where an HTTP response is generated. To process the HTTP request, API 304 accesses label tables stored in the DB(s) 108 to obtain rule sets for routing the client 306 based on the selected services. In particular, the rule sets defined in the label tables, which correspond to one or more service resources, may include condition-action pairs. In the condition-action pairs, a condition matches the one or more S- and C-labels, and an action annotates hyperlinks with the one or more S-labels and modifies the one or more C-labels in the HTTP response.

For example, a rule set stored in the label table may include the following condition-action: S-label, C-label?→URI+, {=, +, −}? C-label? In this embodiment, C-labels are similar to multiprotocol label switching (MPLS), which is a type of data-carrying technique for telecommunications networks using a short path label, and can be classes or priorities defined as=: swap C-label; +: push C-label and −: pop C-label.

In other embodiments, the label tables may be expressed as a decision tree(s) (e.g., a rule set that is implemented as a decision tree), or alternatively as a finite state transducer that may implement the rule sets or decision trees.

An HTTP response format for RESTful Web services appears as follows:

| HTTP response format |
| --- |
| <HTTP Version>   <Response Code> |
| <Response Header> |
| <Response Body> |

Using the above format, the server 308 returns a <response code>, which contains the status of the HTTP request. A <Response Header> contains the metadata and settings about the HTTP response, and the <Response Body> contains the representation, an example of which is shown below, if the request was successful.

As indicated in 408, the HTTP response annotates the hyperlinks with the S-labels and sets the C-labels at 410. The C-labels define the type of client to provide to the API 304. The hyperlinks are annotated with the S-labels as indicated in the following non-limiting example, which may be presented in the HTTP request body. For example, the hypertext 410A is represented as:

| Hypertext (XML, JSON, YAML, etc.) |
| --- |
| < . . . > |
| . . . |
| <link . . . S-labels= "{service labels}" /> |
| <link . . . S-labels= "{service labels}" /> |
| . . . |
| < . . . > |

Here, each operation within the hypertext identifies which link to follow (navigate to) for a particular S-label. An HTTP response 410 including the annotated hyperlinks may then be sent to the client 306 in the form of hypertext 410A.

At 412, the client 306 receives the annotated hyperlinks and determines the next hyperlink to visit based on the S-labels. The process is repeated by sending a sequence of HTTP responses 410 that contain hypertext 410A to the client 306 until all annotated hyperlinks have been visited and the target resource has been reached.

FIGS. 5A-5G illustrate embodiments of a graph structure with nodes representing a resource with corresponding services. It is appreciated that the disclosed embodiments are illustrative of the procedures that may be implemented and are non-limiting. In one embodiment, the server 308 (FIG. 3A) guides the client 306 through a graph structure 502, representative of the network resources U0-U7 connected by hyperlinks for the REST API, towards a target resource. For example, the server 308 receives HTTP requests 504A to 504G from one or more of computing devices 106/201/306 connected via a network 104/212.

The HTTP requests 504A to 504G can be submitted from a browser (not shown) or any other interface capable of generating such HTTP requests. As discussed above, each HTTP request 504A to 504G can include a REST command, such as GET, PUT, POST, DELETE, a target URI unique for a resource and a set of optional parameters or conditions. In the non-limiting example that follows, implementation of the procedures are discussed sequentially. However, it is appreciated that these procedures may be performed in parallel in a distributed manner.

Figure 5A:
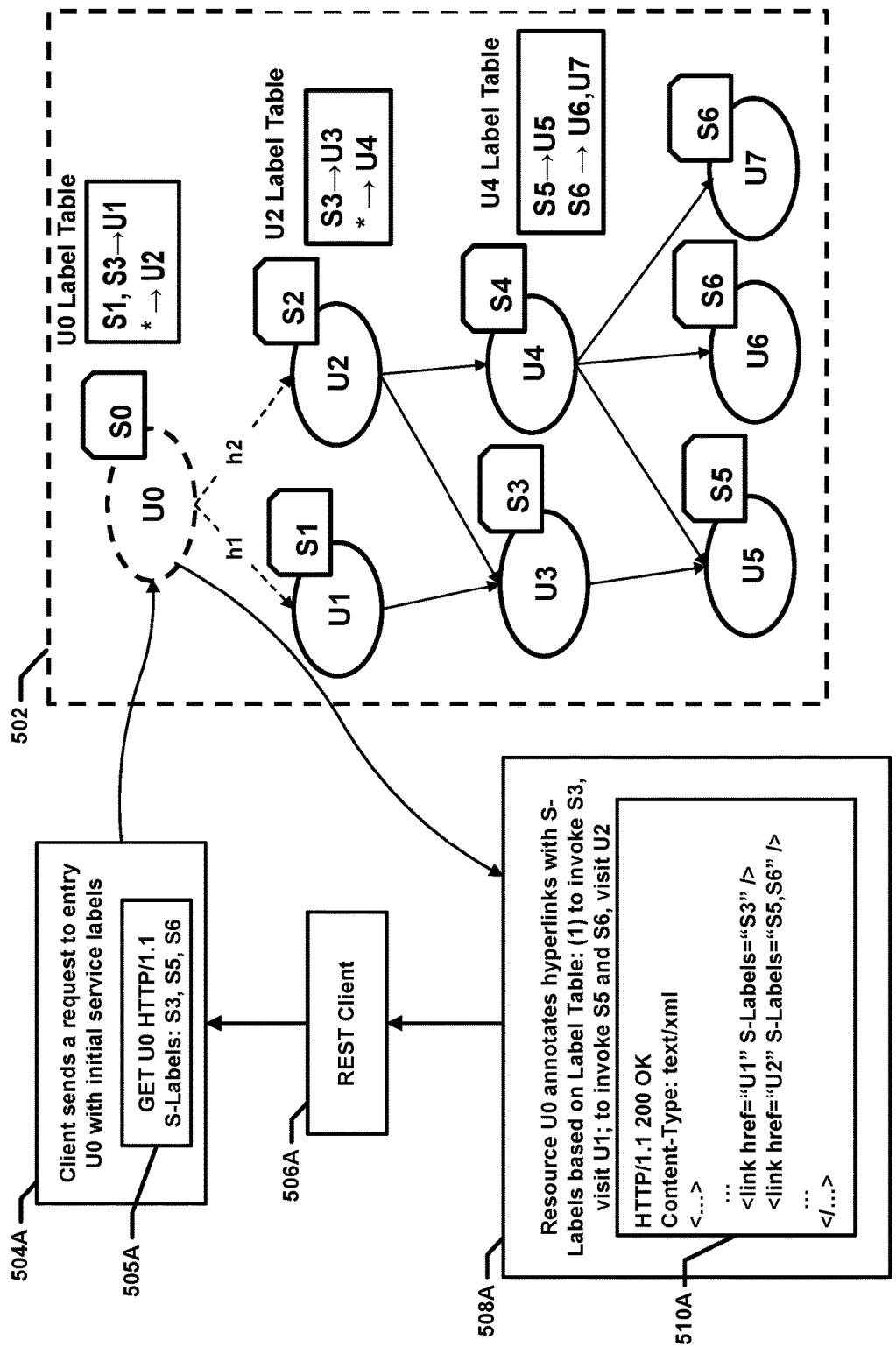
FIGS. 5A-5G illustrate embodiments of a graph structure with nodes representing a resource with corresponding services.

As illustrated in FIG. 5A, the graph structure 502 includes resources U0-U7, each having a corresponding S-label S0-S6 and label table. In the disclosed embodiment, only three label tables are illustrated. However, it is appreciated that each of the resources U0-U7 may have a corresponding label table. In one embodiment, resources U6 and U7 share a same S-label S6.

Navigation of the graph structure 502 begins with the client 306 sending an initial HTTP request 504A to entry resource U0 with an initial set of S-labels it wishes to invoke, represented by the GET U0 HTTP/1.1 with S-Labels: S3, S5, S6 (505A). The HTTP request 504A is requesting services from resources associated with services S3, S5 and S6. Thus, in response, resource U0 is tasked with identifying the next connections the client 306 should take to reach each of the requested resources S3, S5 and S6, and conveying these connections to the client 306.

The HTTP request 504A is received by resource U0, where the label table for resource U0 is accessed. The label table for resource U0 stores rule sets for the resource U0. In the depicted example, the label table instructs resource U0 that if services S1 or S3 are requested, then a hyperlink to resource U1 should be provided, otherwise a hyperlink to resource U2 should be provided. For example, the rule set for the label table of resource U0 is: S1, S3→U1; *→U2.

In view of the HTTP request 504A by client 306 (requesting services from S3, S5 and S6), an HTTP response 508A is generated by resource U0 that includes hyperlinks to both resources U1 and U2. This is implemented at 508A by annotating the hyperlinks h1 and h2 with S-labels based on the label table for resource U0. The HTTP response 508A containing hypertext 510A is represented as:

---
HTTP/1.1 200 OK
---
Content-Type: text/xml
< . . . >
. . .
<link href= "U1" S-Labels="S3" />
<link href= "U2" S-Labels="S5,S6" />
. . .
</ . . . >
---

The HTTP response 508A is returned to the client 306 (e.g., REST client) at 506A such that the client 306 may navigate to the next resource based on the hyperlinks defined in the HTTP response 508A. Thus, in this case, the client 306 may be directed to both resources U1 and U2 via hyperlinks h1 and h2, respectively. It is appreciated that while the procedures for navigating to various hyperlinks and resources are described sequentially, the procedures may also be implemented in a parallel manner.

Figure 5B:
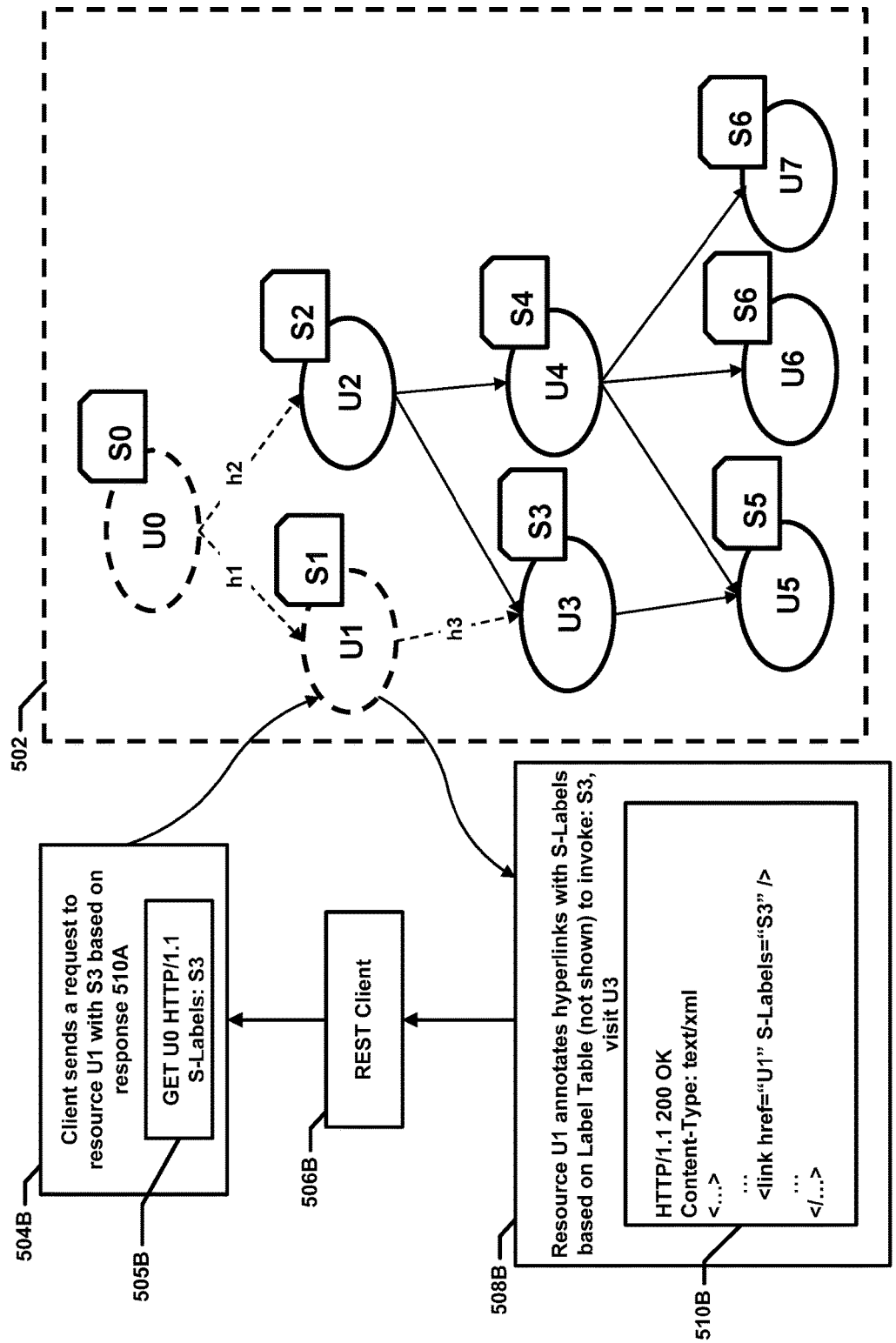

With reference to FIG. 5B, client 306 sends an HTTP request 504B to resource U1 with S-label S3 based on the HTTP response 508A received from server 308. The HTTP request 504B is represented as GET U0 HTTP/1.1 with S-label: S3 (505B). The HTTP request 504B navigates the client 306 to resource U1 that is associated with service S1. At resource U1, the hyperlink h3 is annotated with S-labels based on the rule sets defined in the label table (not shown).

For example, the hyperlink is annotated with S-label S3 and sent as an HTTP response 510B containing hypertext 510B as:

---
HTTP/1.1 200 OK
---
Content-Type: text/xml
< . . . >
. . .
<link href="U1" S-Labels= "S3" />
. . .
</ . . . >
---

The HTTP response 508B is returned to the client 306 (e.g., REST client) at 506B such that the client 306 may be navigated to the next resource based on the hyperlinks defined in the HTTP response 508B. Thus, in this case, the client 306 may be directed to resource U3 via hyperlink h3.

Figure 5C:
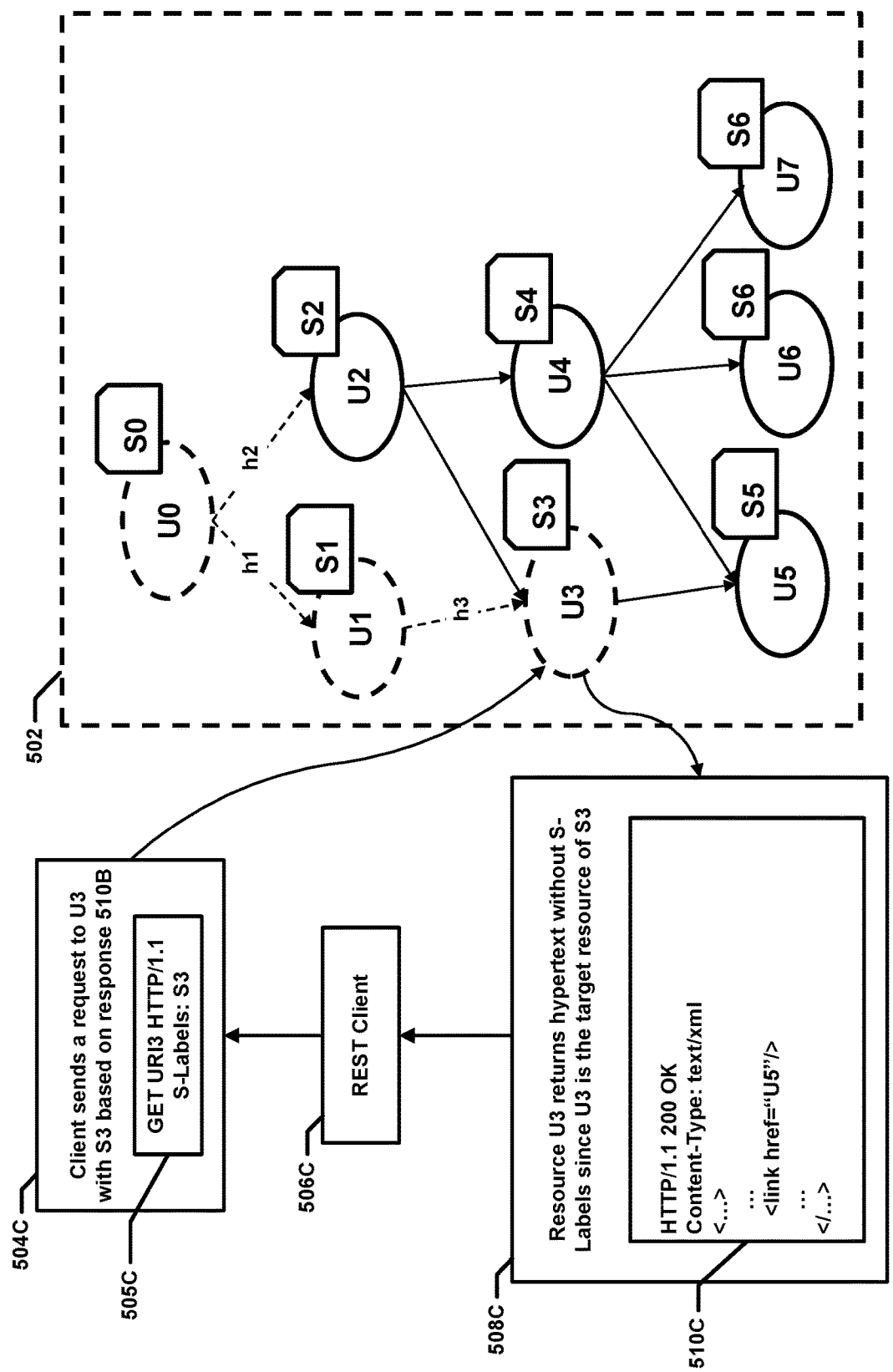

Turning to FIG. 5C, client 306 sends an HTTP request 504C to resource U3 with S-label S3 based on the HTTP response 508C received from server 308. The HTTP request 504C is represented as GET URI3 HTTP/1.1 with S-label: S3 (505C), where URI3 is the URI of resource U3 as identified by the hyperlink in the HTTP response 508B. URI3 navigates the client 306 to resource U3 that is associated with service S3 (one of the originally requested services). Resource U3, then returns hypertext without S-labels since U3 is the target resource for service S3. For example, resource U3 returns an HTTP response 508C containing hypertext 510C as:

---
HTTP/1.1 200 OK
---
Content-Type: text/xml
< . . . >
. . .
<link href="U5"/>
. . .
</ . . . >
---

The HTTP response 508C is returned to the client (e.g., REST client) 306 at 506C.

Figure 5D:
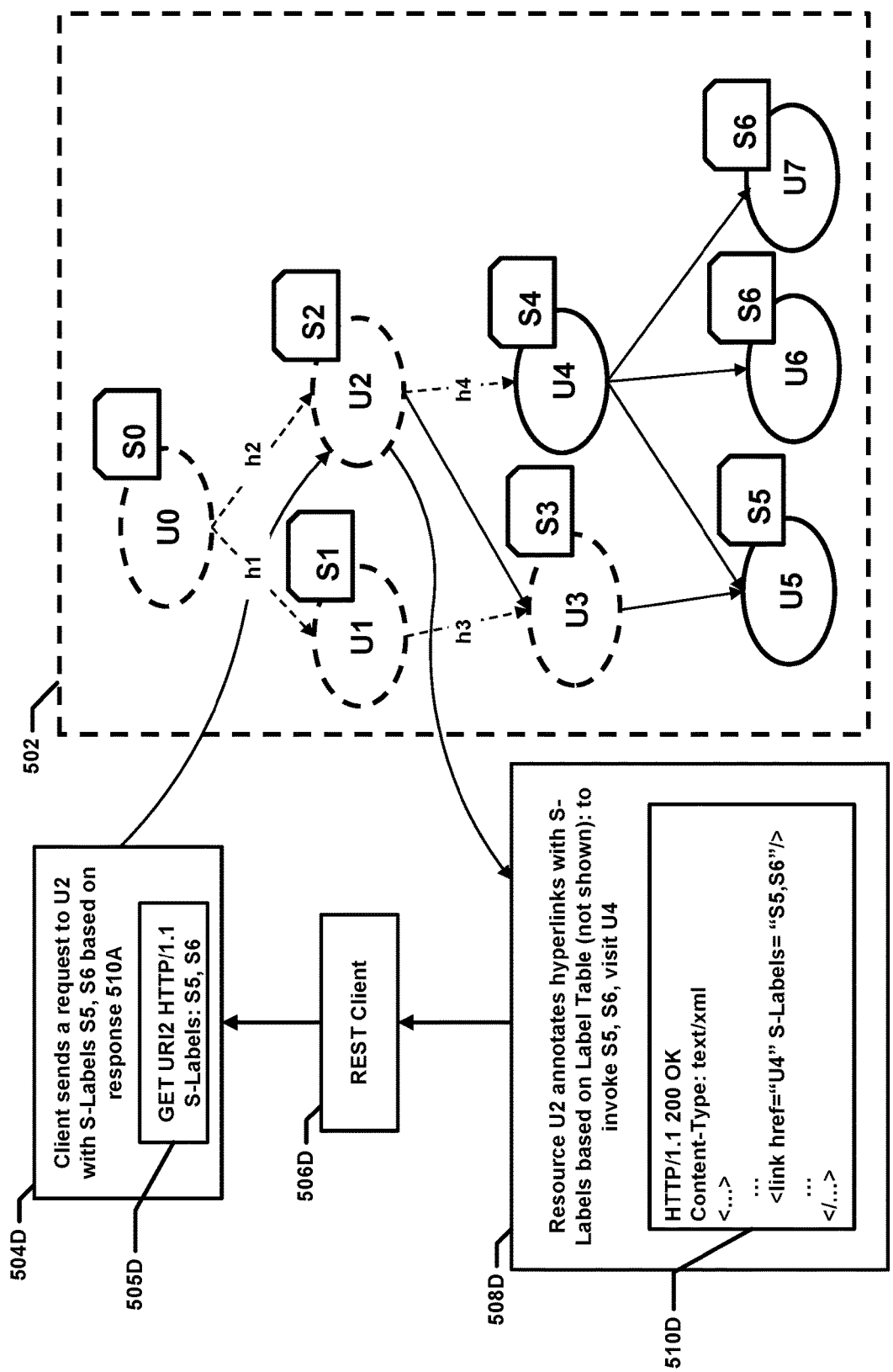

With reference to FIG. 5D, the client 306 sends an HTTP request 504D to resource U2 with S-Labels S5 and S6 to invoke based on the HTTP response 508A received in FIG. 5A. The HTTP request 504D is represented as GET URI2 HTTP/1.1, S-Labels: S5, S6 (505D) such that client 306 is navigated toward resource U2 via URI2 (the URI for resource U2 as provided in the HTTP response). Resource U2 prepares an HTTP response 508D that annotates hyperlink h4 with S-Labels based on the label table (not shown) to invoke services S5, S6 and to navigate resource U4. The HTTP response 508D is comprised of hypertext 510D represented as:

---
HTTP/1.1 200 OK
---
Content-Type: text/xml
< . . . >
. . .
<link href="U4" S-Labels= "S5,S6"/>
. . .
</ . . . >
---

The HTTP response 508D is returned to the client 306 (e.g., REST client) at 506D.

Figure 5E:
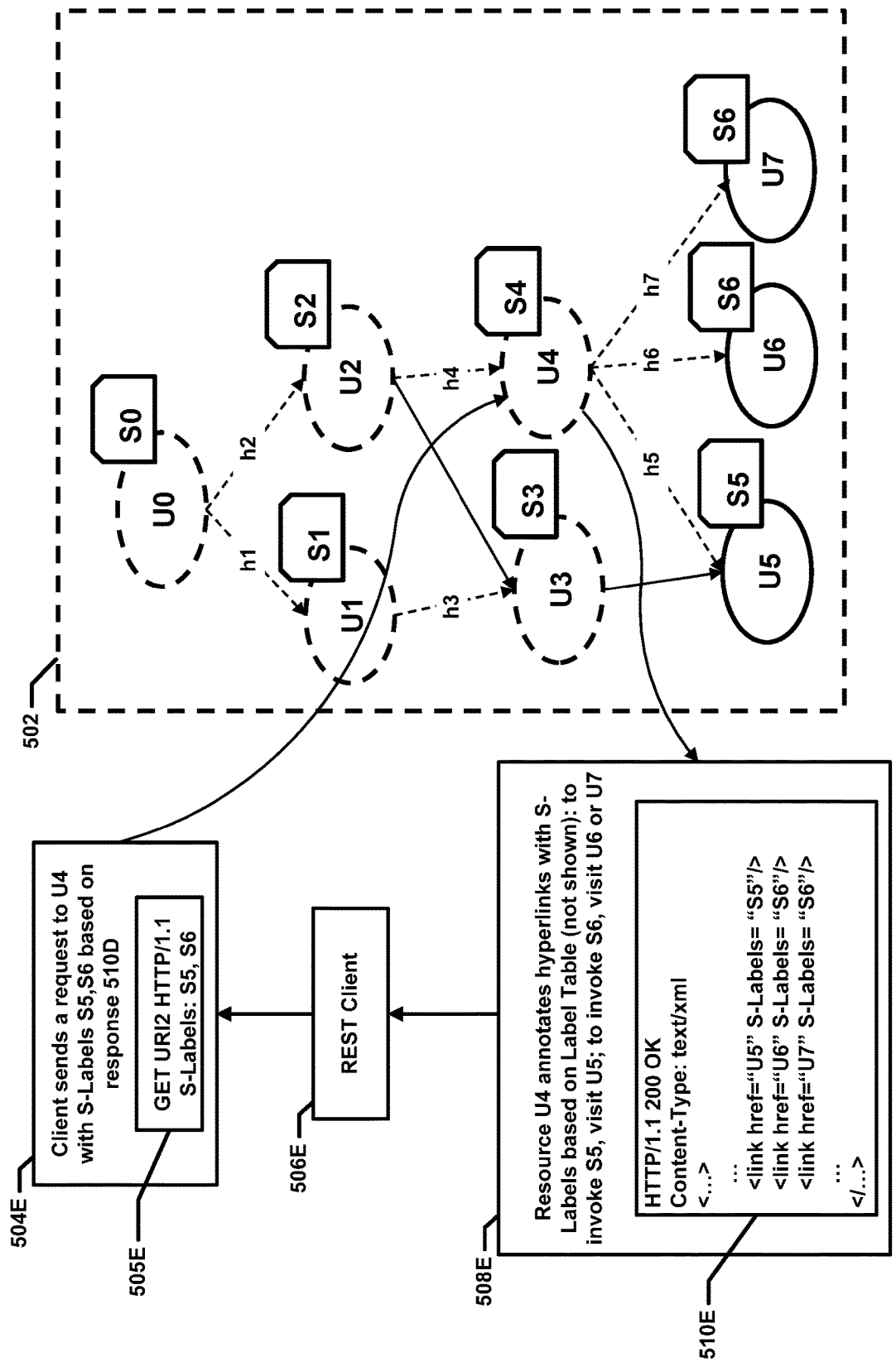

In FIG. 5E, client 306 sends an HTTP request 504E to resource U4 with S-Labels S5, S6 (505E) based on the previously received HTTP response 508D (FIG. 5D). The HTTP request 504E is represented by GET URI2 HTTP/1.1, S-Labels: S5, S6, which is sent to resource U4 via URI2 (the URI for resource U4 as provided in the HTTP response). Resource U4 responds with an HTTP response 508E that annotates hyperlinks h5, h6 and h7 with S-Labels based on a label table (not shown) to invoke services S5, S6 and to navigate to resource U6 or U7, represented in hypertext 510E as:

```
HTTP/1.1 200 OK

Content-Type: text/xml
<...>
    ...
    <link href="U5" S-Labels= "S5"/>
    <link href="U6" S-Labels= "S6"/>
    <link href="U7" S-Labels= "S6"/>
    ...
</...>
```

The HTTP response 508E is returned to the client 306 (e.g., REST client) at 506E.

Figure 5F:
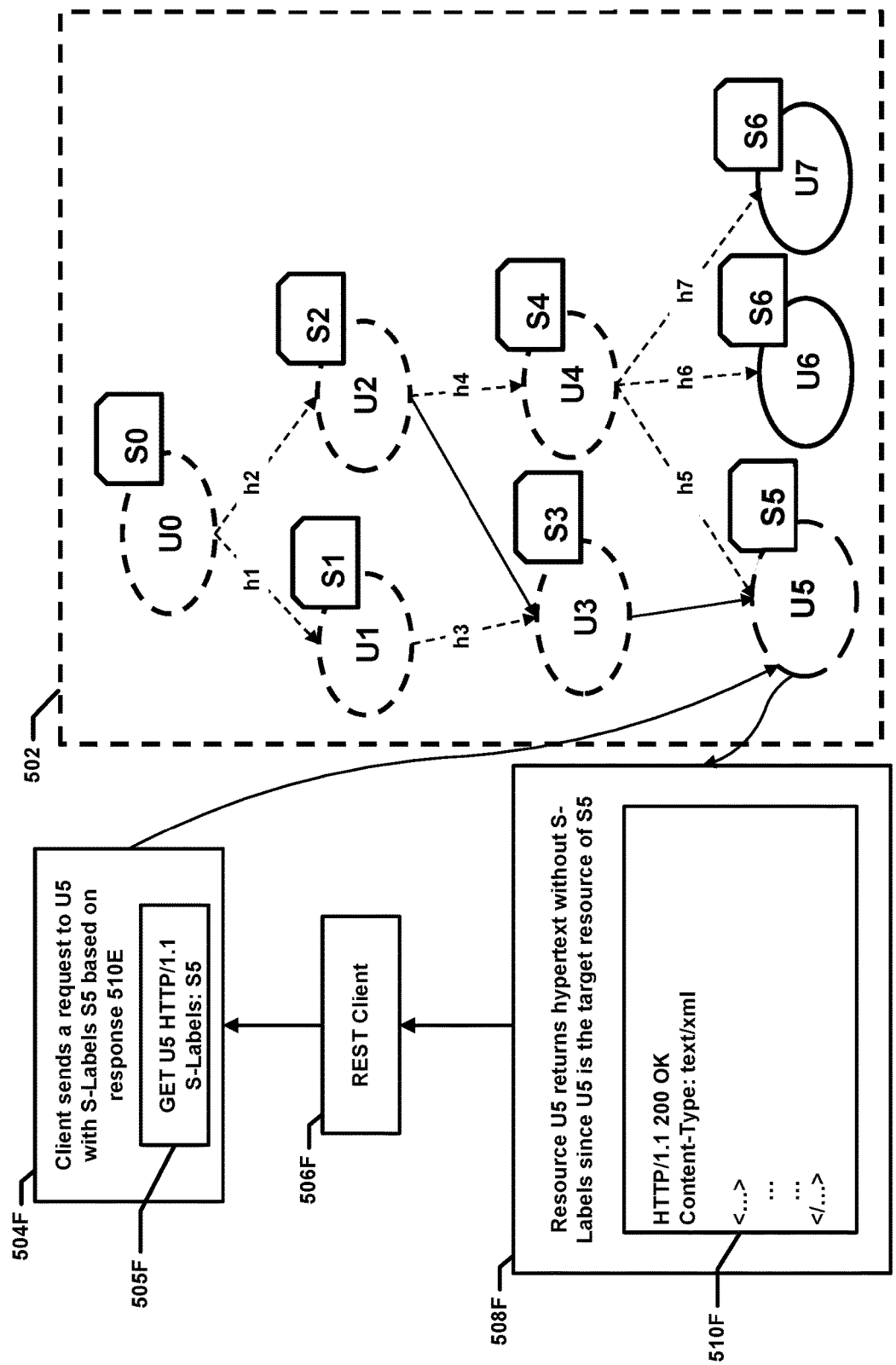

With reference to FIG. 5F, the client 306 sends an HTTP request 504F to resource U5 based on the HTTP response 508E (FIG. 5E), which is represented by GET U5 HTTP/1.1, S-Label S5 (505F). Resource U5 returns the HTTP response 508F containing hypertext 510F without S-Labels since resource U5 is the target resource for service S5. The HTTP response 508F is returned to the client 306 (e.g., REST client) at 506F.

Figure 5G:
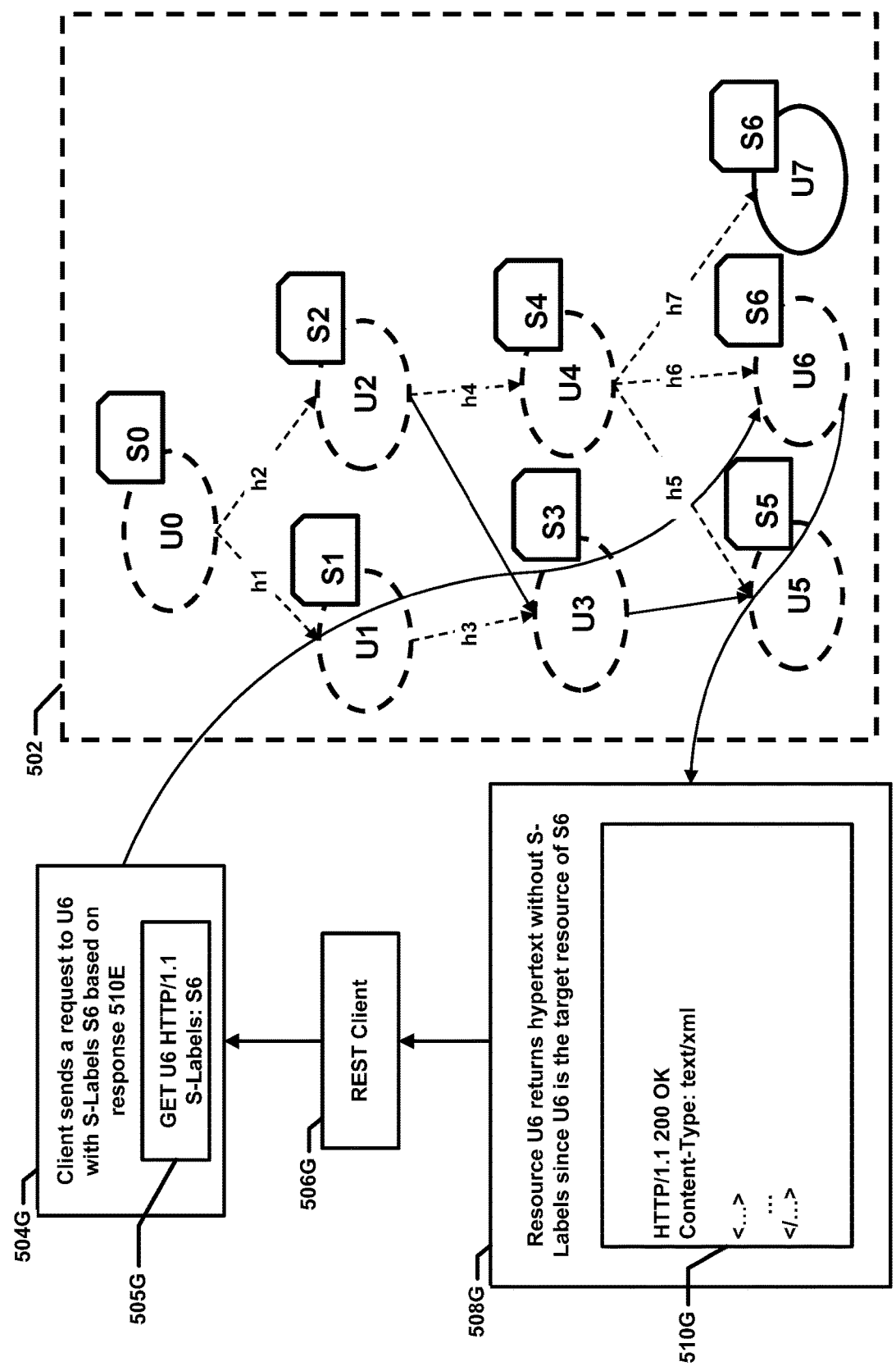

Upon receipt of the HTTP response 508F at the client 306 in FIG. 5G, the client 306 sends an HTTP request 504G to resource S6 with S-Label S6 based on the previously received HTTP response 508E (FIG. 5E). In the previously received HTTP response of 508E, the hypertext 510E provides a hyperlink to either one of resources U6 or U7. In the example of FIG. 5G, the client 306 has selected resource U6. This selection may be based on one of many factors including, but not limited to, local traffic or bandwidth, special services or contractual obligations with a particular client, etc. Since resource U6 is a target resource of service S6, resource U6 returns an HTTP response 508G without S-Labels, which is represented by hypertext 510G. The HTTP response 508G is returned to the client (e.g., REST client) 306 at 506G.

Since all resources (e.g., targeted resources) associated with the requested services S3, S5 and S6 have been visited, the procedure concludes.

Figure 6A:
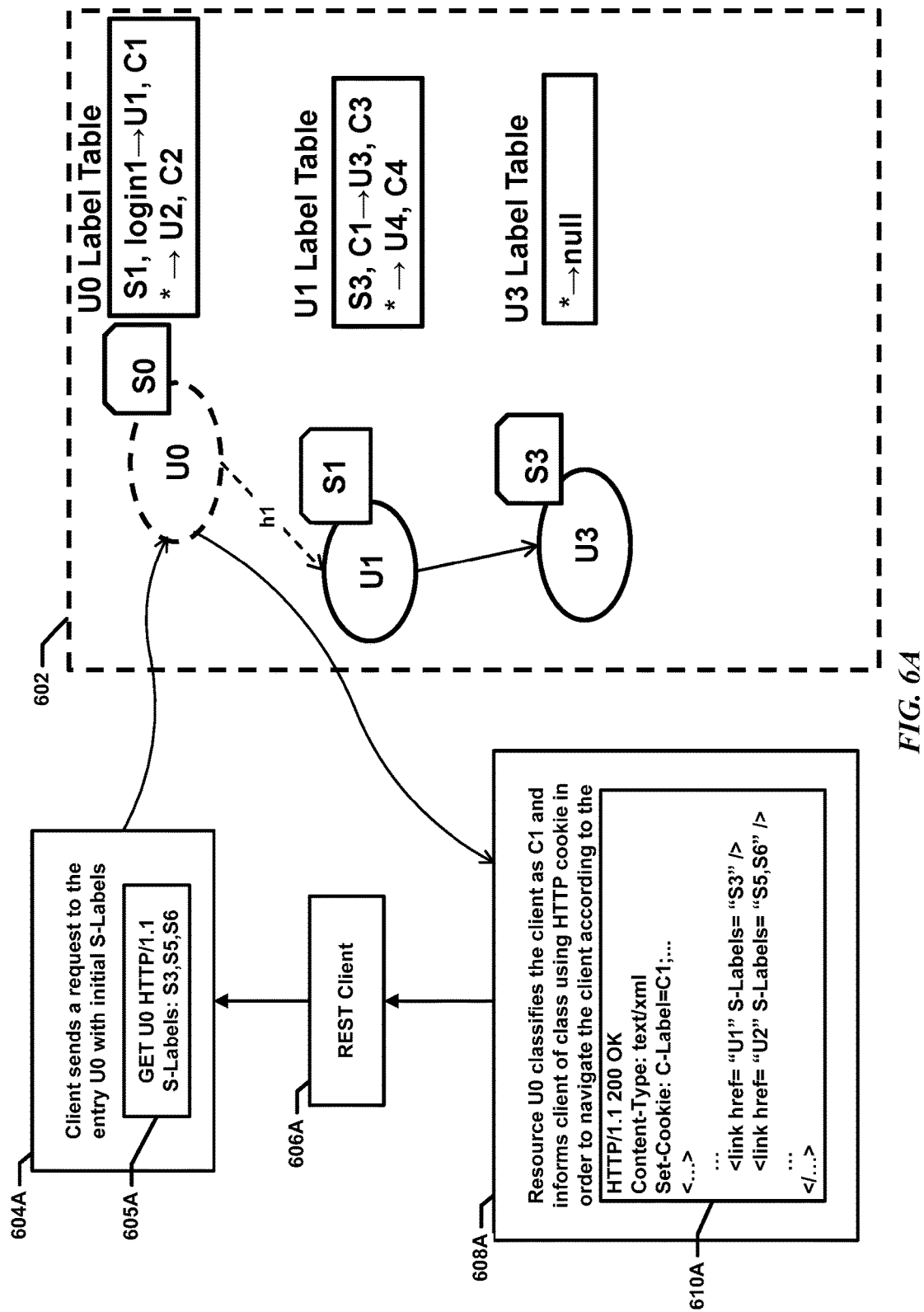
FIGS. 6A and 6B illustrate embodiments of a graph structure with nodes representing a resource with corresponding service and client labels.
Figure 6B:
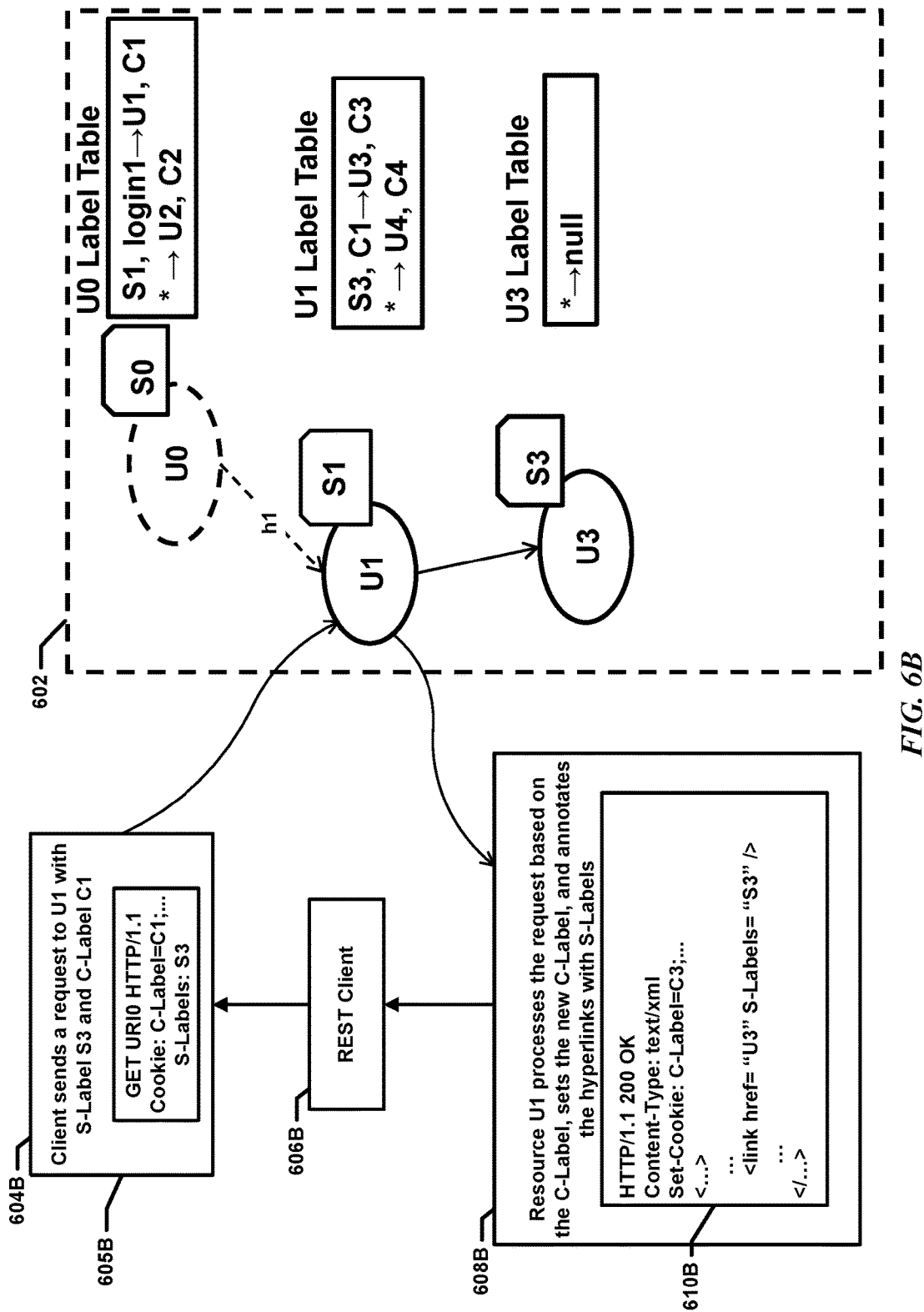

FIGS. 6A and 6B illustrate embodiments of a graph structure with nodes representing a resource with corresponding service and client labels. It is appreciated that the disclosed embodiments are illustrative of the procedures that may be implemented and are non-limiting.

Similar to the description of FIGS. 5A-5G, the server 308 guides the client 306 through a graph structure 602, representative of the network resources connected by hyperlinks for the REST API, towards a target resource. In the non-limiting example of FIGS. 6A and 6B, resources U0, U1 and U3 (and corresponding services and label tables) are illustrated as a partial graph structure 602, which is a portion of the graph structure 502 in FIGS. 5A-5G.

HTTP request 604A is sent by client 306 to entry resource U0 along with the initial S-labels S3, S5 and S6 (representing services the client 306 wants to invoke). The HTTP request 604A is represented by GET U0 HTTP1.1, S-Labels: S3, S5, S6 (605A), which is sent to resource U0. Thus, in response, resource U0 is tasked with identifying the next connections the client 306 should take to reach each of the requested services S3, S5 and S6.

The HTTP request 604A is received by resource U0, where the label table for resource U0 is accessed. The label table for resource U0 stores rule sets for the resource U0. In the depicted example, the label table instructs resource U0 that if service S1 is being requested and the client type is login1, then provide a hyperlink to resource U1 and set client type to C1; otherwise provide a hyperlink to resource U2 and set client type to C2. For example, the rule set for the label table of resource U0 is: S1, login1→U1, C1; *→U2, C2.

Addition of a C-label into the label table allows for a more granular response since the client may be classified and provided different services based on the classification. For example, a type C1 client has premium services which are identified in the label table by associating the client with the premium services. These premium services may include, for example, routing to a server with faster processing. Thus, when the type C1 client is requesting services, the client will be routed to the faster server by virtue of the classification identified in the label table.

In view of the HTTP request 604A by client 306 (requesting services from S3, S5 and S6), an HTTP response 608A is generated by resource U0 that includes a hyperlink to resource U1. This is implemented at 608A by resource U0 annotating the hyperlink h1 with S- and C-labels based on the label table for resource U0. The HTTP response 608A in the form of hypertext 610A is represented as:

```
HTTP/1.1 200 OK

Content-Type: text/xml
Set-Cookie: C-Label=C1; . . .
<...>
    ...
    <link href= "U1" S-Labels= "S3" />
    <link href= "U2" S-Labels= "S5,S6" />
    ...
</...>
```

The HTTP response 608A is returned to the client (e.g., REST client) 306 at 606A such that the client 306 may be navigated to the next resource based on the hyperlink defined in the HTTP response 608A. Thus, in this case, the client 306 may be directed to resource U1 via hyperlink h1.

Next, with reference to FIG. 6B, the client 306 sends a request 604B to resource U1 with S-label S3 and C-label C1, which is represented as GET URI0 HTTP/1.1, Cookie: C-Label=C1, S-Label: S3 (where URI0 is the address associated with hyperlink h1 that navigates the client 306 to resource U1). At resource U1, the HTTP request 604B is processed based on the C-label, sets a new C-label (according to the U1 label table, with rule sets S3, C1→U3, C3; *→U2, C2) and annotates the hyperlink with S-labels. For example, the HTTP response 608B contains the hypertext 610B as:

```
HTTP/1.1 200 OK

Content-Type: text/xml
Set-Cookie: C-Label=C3; . . .
<...>
    ...
```

-continued

```
HTTP/1.1 200 OK

<link href= "U3" S-Labels= "S3" />
...
</...>
```

Since resource U3 is associated with the requested service S3 (i.e., the target resource), the procedure concludes.

FIGS. 7A-7C illustrates example flow diagrams of accessing connected resources in a network according to the disclosed technology. In the description that follows, the procedures may be implemented by a processor(s) residing on a server or client node that executes instructions stored in a memory. For purposes of discussion, the service node executes the procedures in the diagrams and will be discussed in conjunction with the system depicted in FIG. 3A. It is appreciated that the implementation is not limited to such an embodiment and that any combination of system, component(s) or node(s) as illustrated in any one of FIGS. 1, 2, 3A and 8 may execute the procedures.

According to FIG. 7A, connected service resources may be accessed in an API 304 of a network, such as network 104 or 212. Server 308 optionally publishes one or more service labels (S-labels) (and optionally client labels or C-labels), where the S-labels describe services of one or more service resources provided by the API 304 at 700.

At 702, server 308 receives a request from the client 306 that indicates a selection of the published service labels to invoke, such that the services may be provided to the client 306 by the API 304. In one embodiment, the services are provided to the client 306 without revealing connections between the one or more service resources.

At 704, the server 308 identifies the resources to visit for the services requested according to resource connections. The resource connections may be stored, for example, as a label table that is implemented using rule sets or decision trees that define the connections.

In response to receiving the request from the client 306 for services associated with the selected S-labels, the server 308 sends a response containing one or more hyperlinks annotated with the selected one or more service labels, where the one or more hyperlinks are annotated with the service labels to indicate the services requested at 706. The above request-response interaction is repeated to provide a sequence of the one or more hyperlinks to visit based on the selected one or more S-labels, where each of the one or more hyperlinks is directed to a corresponding one of the one or more service resources.

FIG. 7B introduces the selection of client labels (C-labels) for client 306. Here, the client 306 is assigned one or more C-labels in addition to the S-Labels selected at 702. The C-labels may be optionally assigned to the client 306 and may be selected at the same time as the S-labels or independently from the S-labels. Once selected, the server 308 returns a response to the client 306 indicating the selection of C-labels that describe the client 306 at 708.

At 710, the response from the server 308 may modify the C-labels received by the client 306 based on rule sets stored in a database communicatively coupled to the server 308. For example, a C-label may indicate that a client has premium services, in which case the client will be directed to a specific resource in the response. Classification of clients is a process that selects the C-labels for a client, and the selected C-label is assigned to the client by including the C-label in the response. The response will modify the existing C-label of the client.

At 712, the server classifies the client 306 based on the stored rules sets and provides the response to the client 306 with an indication of the classification. For example, the response provided to the client 306 from the server 308 uses an HTTP cookie to assign the client the C-label, as illustrated in FIGS. 6A and 6B.

At 714, the server 308 processes subsequent requests from the client 306 that include one or more C-labels. Processing of the subsequent requests includes, for example, sending a response to the client 306 that indicates one or more new C-labels to replace the existing C-labels from the previously received response.

With respect to FIG. 7C, the client 306 may be routed to from an entry resource to a target resource based on responses provided by the server 308. More specifically, at 716, the client 306 may be routed from an entry resource, such as an initially visited resource, to a target resource, such as a resource providing the requested services, of the one or more service resources that corresponds to the one or more S-labels.

At 718, the server 308 sends to the client 306 resources available during the routing process as annotated hyperlinks in a sequence of responses.

Figure 8:
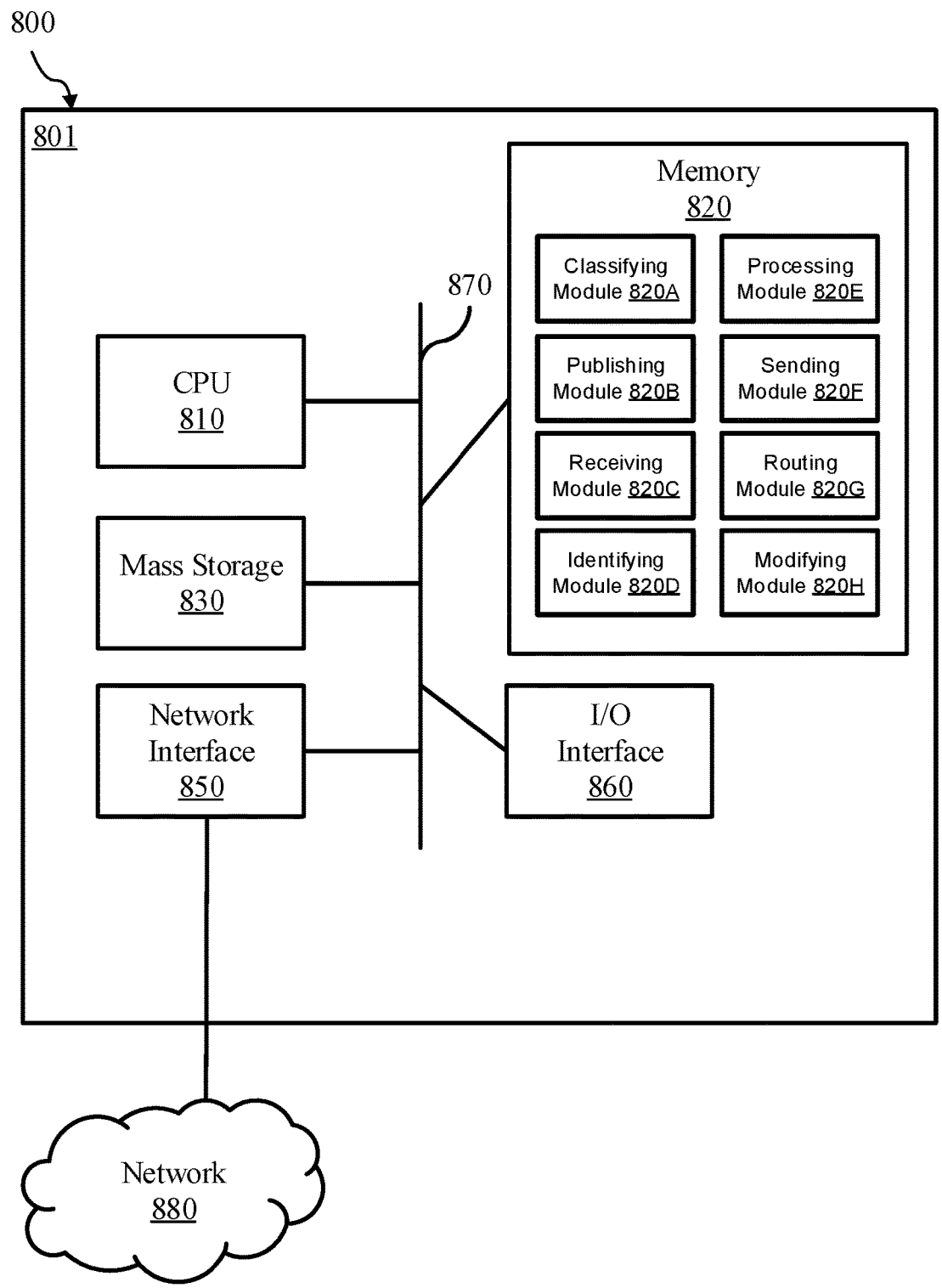
FIG. 8 illustrates a block diagram of a network system that can be used to implement various embodiments.

FIG. 8 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system 800 may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory.

In one embodiment, operations or procedures described in FIGS. 7A-7C may be performed based on modules stored or instantiated in the memory 820. For example, the memory 820 may also include a classifying module 820A to classify client nodes sending requests, a publishing module 820B to publish service labels, a receiving module 820C to receive requests form a client node, an identifying module 820D to identify resources to visit for the service requested, a processing module 820E to process the request with client labels, a sending module 820F to send a response with hyperlinks to identified resources, a routing module 820G to route the client node from an entry resource to a target resource and a modifying module 820H to modify a response using client labels.

The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

There are many benefits to using embodiments of the present disclosure. For example, the disclosed technology introduces an S-label into the HTTP header mechanism used by a REST client to indicate the target services it wishes to invoke in a given order; the S-label hypertext attribute mechanism used by REST resources to inform a client of the hyperlinks to reach the target services; C-label extensions to HTTP cookie used by REST resources to classify REST clients; and a label table mechanism used by REST resources to select the hyperlinks for a client to reach its target resources.

Moreover, the disclosed technology, for REST API: reduces the complexity of REST API description by replacing resource connections with service labels, increases the flexibility of REST API by allowing its resource connections to change dynamically without breaking the clients, increases the performance of REST API by allowing it to balance the loads on its resources based on service and client labels, and maintain the statelessness of REST API (i.e. REST API has no client states) and cache controls (i.e. labels do not change HTTP semantics). For REST clients, it reduces the dependence on resource connections, and increases the efficiency of REST client by replacing heuristic graph search with deterministic navigation. For REST Protocol and Hypertext: remains fully compatible with HTTP 1.1 and 2.0 and all hypertext markup languages: XML, JSON, YAML, etc.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for accessing connected resources in a distributed application programming interface (API) of a network, comprising:
receiving, by a node, a request from a REST client of a client node, the request including one or more service labels indicating a selection of services to invoke;
identifying, by the node, one or more resources to visit for the services requested according to resource connections, each of the one or more resources having a corresponding service label stored in a table; and sending a response, by the node, including one or more hyperlinks to the one or more resources identified, the one or more hyperlinks being annotated with a corresponding one of the service labels to indicate the services requested to the client node.

2. The method of claim 1, wherein
the API defines the resource connections between the one or more resources, and
at least one of the resources provides the selection of services requested.

3. The method of claim 1, further comprising publishing the one or more service labels, wherein the service labels describe services of the one or more of the resources provided by the API.

4. The method of claim 1, wherein
the request further includes a selection of one or more client labels that describe the client node, and
the response to the request modifies the one or more client labels as instructed by the API.

5. The method of claim 4, further comprising
classifying the client node sending a request by sending a response, the response indicating the selected one or more client labels; and
processing the request with the one or more client labels by sending a response to the client node, the response indicating one or more new client labels to replace the existing one or more client labels.

6. The method of claim 4, wherein
the API stores rule sets comprising one or more condition-action pairs defining the annotated one or more hyperlinks, and
a condition matches the one or more service labels and client labels and an action annotates the one or more hyperlinks with the one or more service labels and modifies the one or more client labels in a response.

7. The method of claim 1, further comprising:
routing the client node from an entry resource of the one or more resources to a target resource of the one or more resources that corresponds to the one or more service labels,
wherein the one or more resources available during the routing are sent to the client node as the annotated one or more hyperlinks as a sequence of responses.

8. The method of claim 1, wherein the response to the request does not identify the resource connections between the one or more resources.

9. The method of claim 1, wherein the one or more service labels comprise one or more of a uniform resource identifier (URI) that identifies the services, a URI template that identifies a collection of the services and media types that identify the request to and the response from the services.

10. The method of claim 1, wherein
the request is a hypertext transfer protocol (HTTP) request and the response is a HTTP response, and
the one or more service labels in the annotated one or more hyperlinks are encoded by at least one of HTML, XML, JSON and YAML.

11. A non-transitory computer-readable medium storing computer instructions for accessing connected resources in a distributed application programming interface (API) of a network, that when executed by one or more processors, perform the steps of:
receiving, by a node, a request from a REST client of a client node, the request including one or more service labels indicating a selection of services to invoke;

identifying, by node, one or more resources to visit for the services requested according to resource connections, each of the one or more resources having a corresponding service label stored in a table; and sending a response, by the node, including one or more hyperlinks to the one or more resources identified, the one or more hyperlinks being annotated with a corresponding one of the service labels to indicate the services requested to the client node.

12. The non-transitory computer-readable medium of claim 11, wherein
the API defines the resource connections between the one or more resources, and
at least one of the resources provides the selection of services requested.

13. The non-transitory computer-readable medium of claim 11, wherein
the request further includes a selection of one or more client labels that describe the client node, and
the response to the request modifies the one or more client labels as instructed by the API.

14. The non-transitory computer-readable medium of claim 13, wherein the one or more processors further execute the instructions to perform the steps of:
classifying the client node sending a request by sending a response, the response indicating the selected one or more client labels; and
processing the request with the one or more client labels by sending a response to the client node, the response indicating one or more new client labels to replace the existing one or more client labels.

15. The non-transitory computer-readable medium of claim 13, wherein
the API stores rule sets comprising one or more condition-action pairs defining the annotated one or more hyperlinks, and
a condition matches the one or more service labels and client labels and an action annotates the one or more hyperlinks with the one or more service labels and modifies the one or more client labels in a response.

16. The non-transitory computer-readable medium of claim 11, wherein the one or more processors further execute the instructions to perform the steps of:
routing the client node from an entry resource of the one or more resources to a target resource of the one or more resources that corresponds to the one or more service labels,
wherein the one or more resources available during the routing are sent to the client node as the annotated one or more hyperlinks as a sequence of responses.

17. The non-transitory computer-readable medium of claim 11, wherein the response to the request does not identify the resource connections between the one or more resources.

18. The non-transitory computer-readable medium of claim 11, wherein the one or more service labels comprise one or more of a uniform resource identifier (URI) that identifies the services, a URI template that identifies a collection of the services and media types that identify the request to and the response from the services.

19. A node for accessing connected resources in a distributed application programming interface (API) of a network, comprising:
a non-transitory memory storage comprising instructions; and
one or more processors in communication with the memory, wherein the one or more processors execute the instructions to:

receive a request from a REST client of a client node, the request including one or more service labels indicating a selection of services to invoke;

identify one or more resources to visit for the services requested according to resource connections, each of the one or more resources having a corresponding service label stored in a table; and send a response including one or more hyperlinks to the one or more resources identified, the one or more hyperlinks being annotated with a corresponding one of the service labels to indicate the services requested to the client node.

20. The node of claim 19, wherein the request further includes a selection of one or more client labels that describe the client node, and the response to the request modifies the one or more client labels as instructed by the API.

21. The node of claim 20, wherein the one or more processors execute the instructions to:

classify the client node sending a request by sending a response, the response indicating the selected one or more client labels; and process the request with the one or more client labels by sending a response to the client node, the response indicating one or more new client labels to replace the existing one or more client labels.

22. The node of claim 19, wherein the one or more processors execute the instructions to:

route the client node from an entry resource of the one or more resources to a target resource of the one or more resources that corresponds to the one or more service labels, wherein the one or more resources available during the routing are sent to the client node as the annotated one or more hyperlinks as a sequence of responses.

23. The node of claim 19, wherein the response to the request does not identify the resource connections between the one or more resources.

\* \* \* \* \*